United States Patent
Yokouchi et al.

(10) Patent No.: US 7,432,678 B2
(45) Date of Patent: Oct. 7, 2008

(54) MOTOR DRIVING APPARATUS AND CONTROL METHOD THEREOF

(75) Inventors: Tomoharu Yokouchi, Osaka (JP); Keisuke Kuroda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 2 days.

(21) Appl. No.: 11/560,427

(22) Filed: Nov. 16, 2006

(65) Prior Publication Data

US 2007/0108930 A1    May 17, 2007

(30) Foreign Application Priority Data

Nov. 17, 2005 (JP) .............................. 2005-332601

(51) Int. Cl.
*H02P 7/00* (2006.01)
*H02P 27/04* (2006.01)

(52) U.S. Cl. ........................ 318/434; 318/801; 318/809; 318/811

(58) Field of Classification Search ................. 318/138, 318/254, 439, 720–724
See application file for complete search history.

(56) References Cited

U.S. PATENT DOCUMENTS

| 5,327,064 A | * | 7/1994 | Arakawa et al. | ............. 318/801 |
| 5,448,154 A | * | 9/1995 | Kanke et al. | ................... 322/28 |
| 6,525,506 B2 | * | 2/2003 | Jin | .............................. 318/801 |

FOREIGN PATENT DOCUMENTS

JP          05-122834       5/1993

* cited by examiner

*Primary Examiner*—Taghi T. Arani
*Assistant Examiner*—Thai Dinh
(74) *Attorney, Agent, or Firm*—RatnerPrestia (57) ABSTRACT

A motor driving apparatus includes a speed control circuit for outputting a speed control signal on the basis of a target speed command and rotating speed information of a motor, a PWM signal generating circuit for generating and outputting a PWM signal on the basis of the speed control signal, a switching circuit for feeding power to motor windings on the basis of the PWM signal, and a protection circuit including a full torque detecting circuit for detecting a full torque status in which the speed control signal is a signal for instructing maximum torque. The protection circuit outputs a signal for stopping the switching circuit when the full torque detecting circuit detects a full torque status continuously for a specified time.

10 Claims, 7 Drawing Sheets

Fig. 7

MOTOR DRIVING APPARATUS AND CONTROL METHOD THEREOF

BACKGROUND ART

1. Field of the Invention

The invention relates to a motor driving apparatus, and more particularly to circuit elements in a semiconductor integrated circuit such as motor driving LSI for driving a motor when the motor is going out of speed controllable range due to abnormal excessive load by external factors, or to a protection technology for preventing winding coils of a motor from being broken down.

2. Related Art

Conventional control method of a brushless motor detects a rotating speed of a rotor using a detecting element such as a Hall element. A speed control circuit compares the detected speed information with a target speed signal to generate a speed control signal for controlling the rotating speed of the motor.

When a brushless motor rotating at a constant speed is stopped by force due to external load applied to the rotor of the motor, a rotating speed signal is not applied to the speed control motor because the motor is stopped. As a result, the speed control circuit judges that the motor does not reach the target rotating speed, and continues to issue a speed control signal to instruct a full acceleration. Consequently, a large current continues to flow in output transistors for driving the motor, possibly leading to breakdown of output transistors or breakdown of winding coils of the brushless motor.

To avoid such problems, a technology is disclosed, for example, in patent document 1. Patent document 1 discloses a protective technology in the event of forced stop of rotor due to external load applied to rotor or other parts of brushless motor during rotation at constant speed.

Patent document 1: JP-A-5-122834

The protection technology in the conventional motor driving apparatus disclosed in patent document 1 is designed to operate a protection circuit after complete stop of the motor and complete stop of output of the motor position detection signal (or rotating speed signal). Hence, when much time elapses until the motor stops completely due to abnormal excessive load caused by certain external factors, it takes much time to start the protecting operation. As a result, a duration for which a large current flows in the output transistor for driving the motor is increased, and the output transistor may be broken or a stator winding of the brushless motor may be broken.

In the event of abnormal excessive load by certain external factor not stopping the motor completely, the motor position detection signal continues to be issued, and the protecting operation does not function. As a result, a large current continues to flow in the output transistor for driving the motor, resulting in breakdown of the output transistor or the stator windings of the brushless motor.

SUMMARY OF THE INVENTION

The invention is directed to solve the above problems, and it is hence an object thereof to present a protection circuit for protecting the output transistor and others securely when an abnormal excessive load is applied to the motor by certain external factors, and a motor driving apparatus having the same.

A motor driving apparatus according to the invention includes: a speed control circuit for outputting a speed control signal on the basis of a target speed command and rotating speed information of a motor; a PWM signal generating circuit for generating and outputting a PWM signal on the basis of the speed control signal; a switching circuit for feeding power to motor windings on the basis of the PWM signal; and a protection circuit. The protection circuit includes a full torque detecting circuit for detecting a full torque status in which the speed control signal is a signal for instructing maximum torque, and outputs a signal for stopping the switching circuit when the full torque detecting circuit detects a full torque status continuously for a specified time.

The protection circuit may have a latch circuit for holding the signal for stopping the switching circuit. In this case, the holding state of the latch circuit may be released by a signal for instructing stop of the motor operation.

The protection circuit has a latch circuit for holding the signal for stopping the switching circuit and a deceleration command detecting circuit for outputting a deceleration command detection signal when detecting that the speed control signal becomes lower than a speed controllable range, and the holding state of the latch circuit is released by the deceleration command detection signal.

The motor driving apparatus may further include a supply voltage reset circuit for outputting a reset signal when detecting that a supply voltage is equal to or lower than a specified value. The protection circuit may have a latch circuit for holding the signal for stopping the switching circuit. In this case, the holding state of the latch circuit may be released by a reset signal.

The PWM signal generating circuit may include a current detecting resistance for detecting a motor driving current, an amplifier for amplifying the speed control signal, a clamp circuit for receiving the output of the amplifier, and clamping the output to a clamp voltage when the output of the amplifier exceeds a specified clamp voltage, a comparator for comparing the voltage generated on the current detecting resistance with the output voltage of the clamp circuit, and a circuit for generating a PWM signal on the basis of the output signal of the comparator. In this case, the detection level of the full torque detecting circuit may preferably be set at a value equal to or more than the value of the speed control signal provided when the output of the amplifier reaches the clamp voltage.

The PWM signal generating circuit may include a triangular wave oscillator for generating a triangular wave, an amplifier for amplifying the speed control signal on the basis of a specified voltage, and a comparator for comparing the output signal of the amplifier and the output signal of the triangular wave oscillator to output a PWM signal. In this case, the detection level of the full torque detecting circuit may preferably be set at a value equal to or more than the voltage of the speed control signal provided when the duty of the PWM control signal becomes maximum.

A control method according to the invention is a method of controlling a motor driving apparatus which includes a speed control circuit for outputting a speed control signal on the basis of a target speed command and rotating speed information of a motor, a PWM signal generating circuit for generating and outputting a PWM signal on the basis of the speed control signal, a switching circuit for feeding power to motor windings on the basis of the PWM signal. The control method includes detecting a full torque status in which the speed control signal is a signal for instructing maximum torque, and stopping the switching circuit when the full torque status is detected continuously for a specified time.

According to the invention, when it takes much time to stop the motor completely after abnormal excessive load is applied from certain external factors, or even when such abnormal excessive load by certain external factors that the motor is not stopped completely is applied to the motor, the protection circuit can start operating when a large current due to excessive load applied to the motor starts flowing in the output transistor for driving the motor. Hence, breakdown of output transistors or winding coils of the brushless motor can be prevented, resulting in secure protection of the motor.

DETAIL DESCRIPTION OF THE PREFERRED EMBODIMENTS

Preferred embodiments of the invention are described below with reference to the accompanying drawings.

Embodiment 1

1. Configuration of Motor Driving Apparatus

Figure 1:
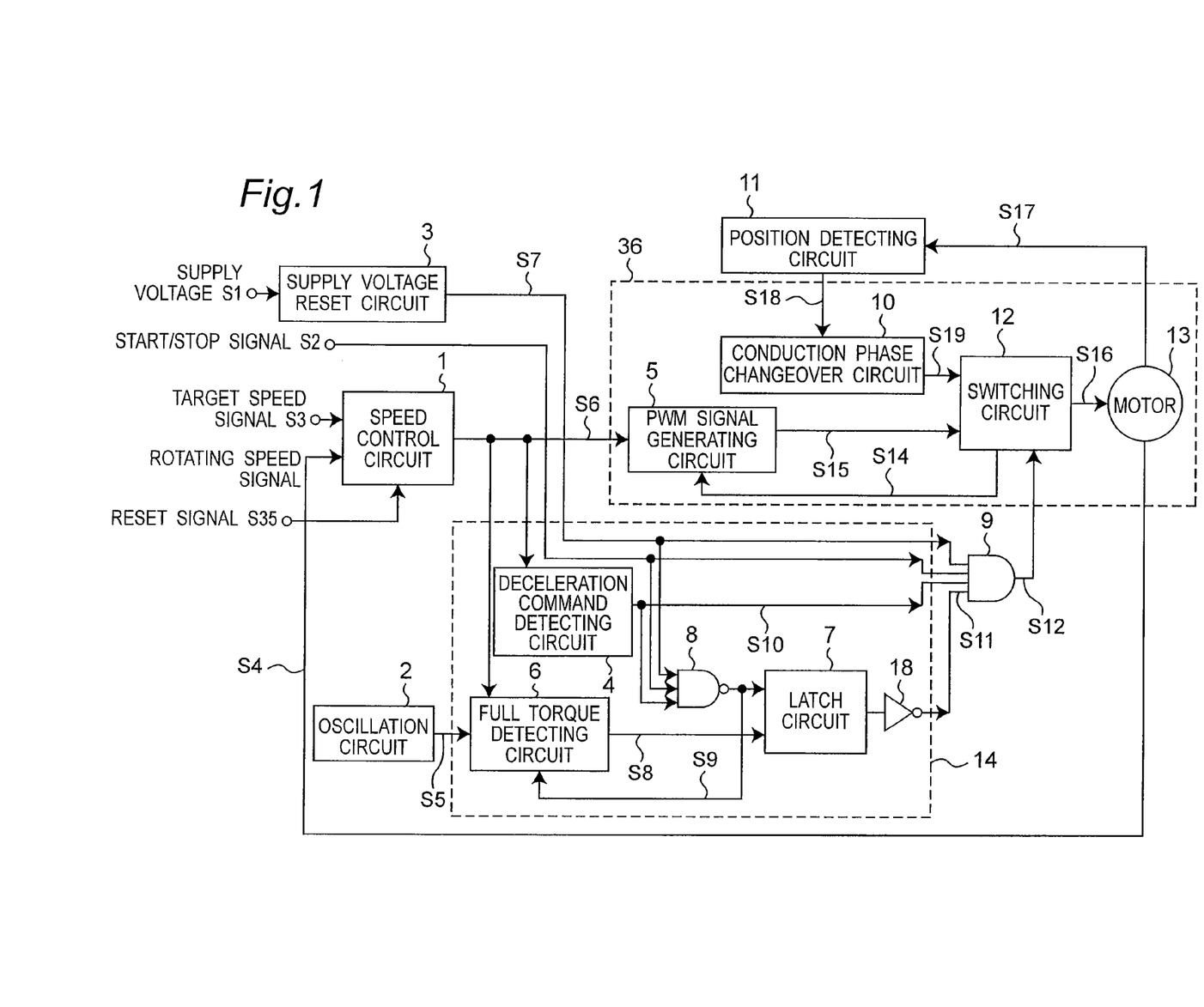
FIG. 1 is a block diagram of a motor driving apparatus according to embodiment 1 of the invention.

FIG. 1 is a block diagram of a motor driving apparatus according to embodiment 1 of the invention. The motor driving apparatus in FIG. 1 includes a speed control circuit 1 for outputting a speed control signal, an oscillation circuit 2 for outputting a specified clock signal, a supply voltage reset circuit 3 for monitoring a supply voltage, a driving circuit 36 for supplying a motor 13 with a driving voltage, a protection circuit 14 for protecting the driving circuit 36, an AND circuit 9, and a position detecting circuit 11 for detecting position of a rotor of the motor 13.

The driving circuit 36 has a PWM signal generating circuit 5 for generating a PWM signal, a conduction phase changeover circuit 10 for outputting a control signal for changing over the power feeding phases, and a switching circuit 12 for providing a driving voltage of the motor 13.

The protection circuit 14 has a deceleration command detecting circuit 4 for detecting that the speed control signal is a deceleration command on the basis of the speed control signal, a full torque detecting circuit 6 for detecting that the motor operation state is at a full torque status on the basis of the speed control signal, a latch circuit 7, and a NAND circuit 8.

The deceleration command detecting circuit 4 monitors the speed control signal S6, and upon detecting that the speed control signal S6 is equal to or lower than a lower limit of a specified control range, outputs an output signal S10 ("L") showing the fact.

When reset by a reset signal S35, the speed control circuit 1 controls the speed control signal S6 to be equal to or lower than the control range.

The supply voltage reset circuit 3 monitors the value of the supply voltage S1. The supply voltage reset circuit 3 sets the output signal S7 at "H" when it is detected the value is within an operation range, and at "L" when it is detected that the value is equal to or below the specified operation range.

A start/stop signal S2 is a control signal instructing stopping of motor, and is controlled to "H" for a start command, and "L" for a stop command.

2. Outline of Operation of Motor Driving Apparatus

Outline of operation of the motor driving apparatus having such configuration is explained below.

The speed control circuit 1 receives a target speed signal S3 instructing the target speed of the motor 13, and a rotating speed signal S4 indicating the rotating speed of the motor 13. The rotating speed signal S4 is obtained from rotation of the motor 13. The speed control circuit 1 compares the target speed signal S3 with the rotating speed signal S4 to generate a speed control signal S6 for maintaining the rotating speed of the motor 13 at a target rotating speed. The PWM signal generating circuit 5 receives the speed control signal S6, and outputs a PWM control signal S15 on the basis of the speed control signal S6.

The position detecting circuit 11 receives a position signal S17 of the motor 13 and outputs a position detection signal S18. The position detection signal S18 is supplied to a conduction phase changeover circuit 10. The conduction phase changeover circuit 10 outputs a signal S19 for determining a phase to be supplied with a power of the driving coils of the motor 13 on the basis of the position of the motor 13. The switching circuit 12 synthesizes a PWM control signal S15 from the PWM signal generating circuit 5 and an output signal S19 from the conduction phase changeover circuit 10, and outputs a motor driving signal S16 for rotating the motor 13.

Thus, the speed of the motor 13 is controlled by a feedback loop composed of the speed control circuit 1, PWM signal generating circuit 5, switching circuit 12, position detecting circuit 11, conduction phase changeover circuit 10, and motor 13.

The AND circuit 9 integrates the output signal S7 of the supply voltage reset circuit 3, start/stop signal S2, output signal S10 of the deceleration command detecting circuit, and output signal S11 of the latch circuit 7, and when at least one of these signals is "L", outputs a control signal for stopping the operation of the switching circuit 12 (that is, a control signal for cutting off the motor driving signal S16 output from the switching circuit 12). In other words, the switching circuit 12 is stopped forcibly when at least one of the following conditions is satisfied:

1) when the supply voltage S1 becomes out of the control range;

2) when the start/stop signal S2 shows a stop command;

3) when the speed control signal S6 becomes below the lower limit of the speed controllable range; and 4) when the protecting operation by the protection circuit 14 functions.

3. Protection Circuit

Details of the protection circuit 14 are described below.

<Outline of Protection Circuit>

The protection circuit 14 outputs a signal for stopping operation of the switch circuit 12 when a full torque status is detected continuously for a specified time. The full torque status is detected by the full torque detecting circuit 6, and is a status in which a signal instructing maximum torque based on the speed control signal S6 is being outputted, or a status in which the motor is operating at the maximum driving current. The specified time, for example, is one second or more.

Specifically, the full torque detecting circuit 6 receives the output clock S5 of the oscillation circuit 2 as reference clock signal, and further receives the speed control signal S6 from the speed control circuit 1. The full torque detecting circuit 6 measures the duration of full torque status in synchronous with the clock S5 on the basis of the speed control signal S6. When judging that the full torque status continues for a specified time, the full torque detecting circuit 6 sends an output signal S8 ("H") indicating that the full torque status continues for a specified time to the latch circuit 7.

The latch circuit 7 receives the output signal S8, outputs a signal S11 for cutting off the motor driving signal S16 supplied from the switching circuit 12, and holds this status. That is, when the output signal S8 of the full torque detecting circuit 6 becomes "H", the latch circuit 7 is set to output the signal S11 ("L") for cutting off the motor driving signal S16, and holds this status.

The latch circuit 7 is reset when the output signal S9 of the NAND circuit 8 becomes "H", that is, in the following cases, thus canceling the cut-off holding status:

a) when the start/stop signal S2 becomes "L" (stop);
  b) when the output signal S7 of the supply voltage reset circuit 3 becomes "L" (that is, when the supply voltage S1 is out of a specified control range); and
  c) when the output signal S10 of the deceleration command detecting circuit 4 becomes "L" (the speed control signal S6 becomes below the lower limit of the control range).

<Configuration and Operation of Protection Circuit>

Figure 2:
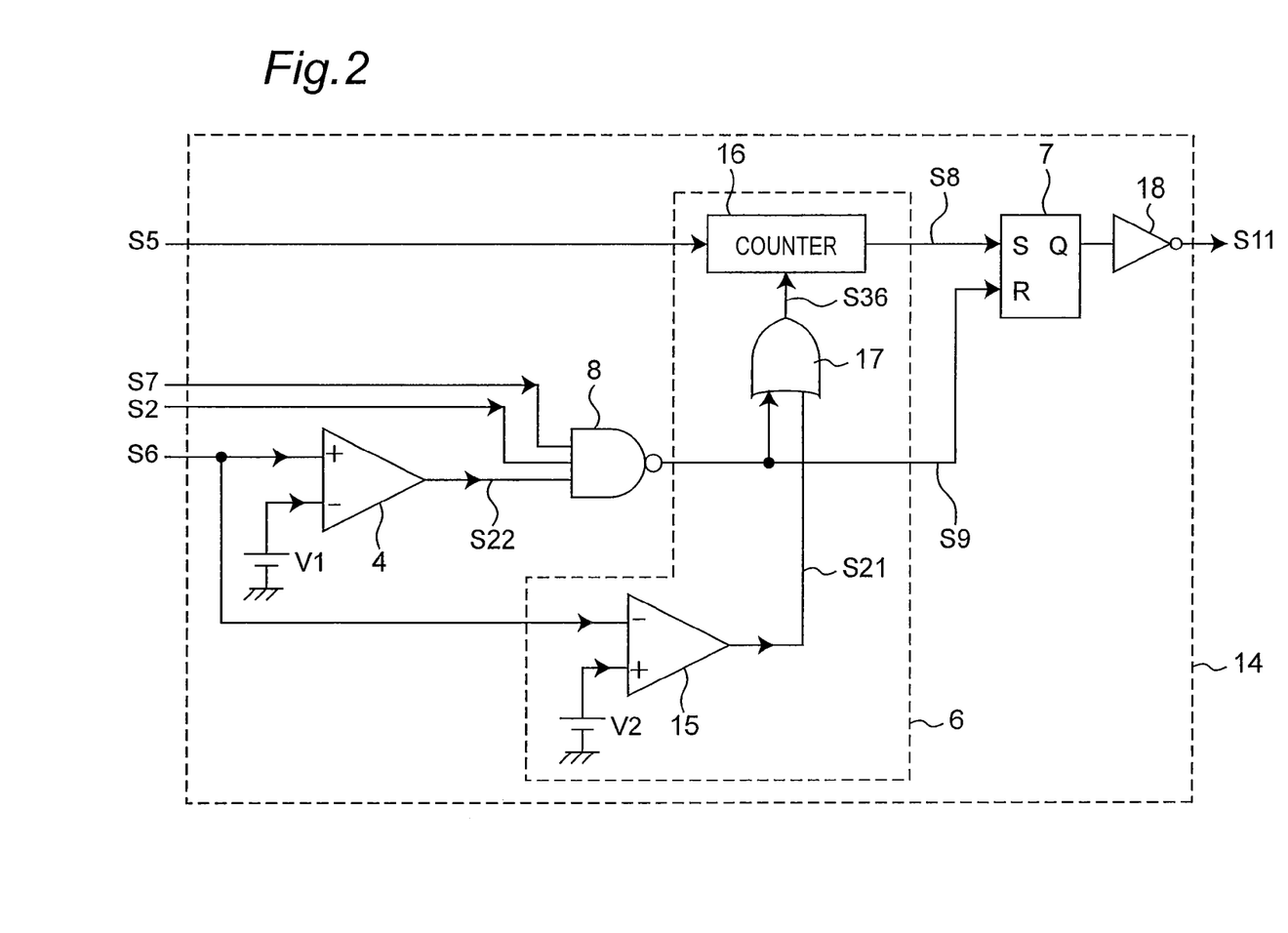
FIG. 2 is a diagram showing a detail configuration of a protection circuit in the motor driving apparatus.

FIG. 2 shows a detail configuration of the protection circuit 14 (in particular, the full torque detecting circuit 6). In the drawing, the full torque detecting circuit 6 includes a comparator 15, a counter 16, and an OR circuit 17.

The comparator 15 compares the speed control signal S6 with a full torque detection level V2 which is a reference voltage for detecting the full torque status, and renders the output signal S21 to "L" when the voltage of the speed control signal S6 is equal to or more than the full torque detection level V2 (that is, in full torque status).

The deceleration command detecting circuit 4 includes a comparator. The deceleration command detecting circuit 4 renders the output signal S22 to "L" when the voltage of the speed control signal S6 is equal to or less than a deceleration command detection level V1 (that is, below a controllable range). The deceleration command detection level V1 is a reference voltage to judge if the speed control signal S6 is not more than the controllable range or not.

As described above, the start/stop signal S2 is controlled at "H" for a start command, and "L" for a stop command. As far as the supply voltage S1 is within an operating range, the output signal S7 of the supply voltage reset circuit 3 is controlled at "H", and "L" when the supply voltage S1 is equal to or less than operating range.

Hence, in the state that the start/stop command S2 is the start command "H" and the output S7 of the supply voltage reset circuit is "H" state in operating range of power source S1, when the speed control signal S6 is in the full torque status, the output signal S21 of the comparator 15 is "L", and the output signal S22 of the deceleration command detecting circuit 4 is "H".

Since all of the start/stop signal S2, the output signal S7 of the supply voltage reset circuit and the output signal S22 of the comparator 4 are "H", the output signal S8 of the NAND circuit 8 is "L". Both the output signal S8 of the NAND circuit 8 and the output signal S21 of the comparator 15 are "L", and the output signal S36 of the OR circuit 17 is "L".

The counter 16 counts the output clock S5 of the oscillation circuit 2, and is reset when the output S36 of the OR circuit 17 is "H". Hence, while the output S36 of the OR circuit 17 is being "L", the counter 16 continues to count, and when counting a specified value, the output S20 is changed from "L" to "H".

When the output S20 of the counter 16 is changed to "H", the latch circuit 7 including a RS flip-flop is set, so that the output S11 of the inverter 18 is changed from "H" to "L". The output S11 of "L" causes the output S12 of the AND circuit 9 to change from "H" to "L". When the output S12 of the AND circuit 9 changes to "L", the switching circuit 12 cuts off the output of the motor driving signal S16.

The cut-off state of the motor driving signal S16 is released in the following cases:

a) "L" is set in the start/stop signal S2;
  b) The supply voltage S becomes below the operating range, and the output signal S7 of the supply voltage reset circuit is "L"; and
  c) The output S22 of the deceleration command detecting circuit 4 is "L" by setting the speed control signal S6 equal to or less than a voltage of the deceleration command detection level V1.

In these cases a) to c), the latch circuit 7 is reset. At this time, since the output signal S8 of the NAND circuit 8 is "H", the output S36 of the OR circuit 17 is "H", so that the counter 16 is reset.

<Output Signal Waveforms>

Figure 3:
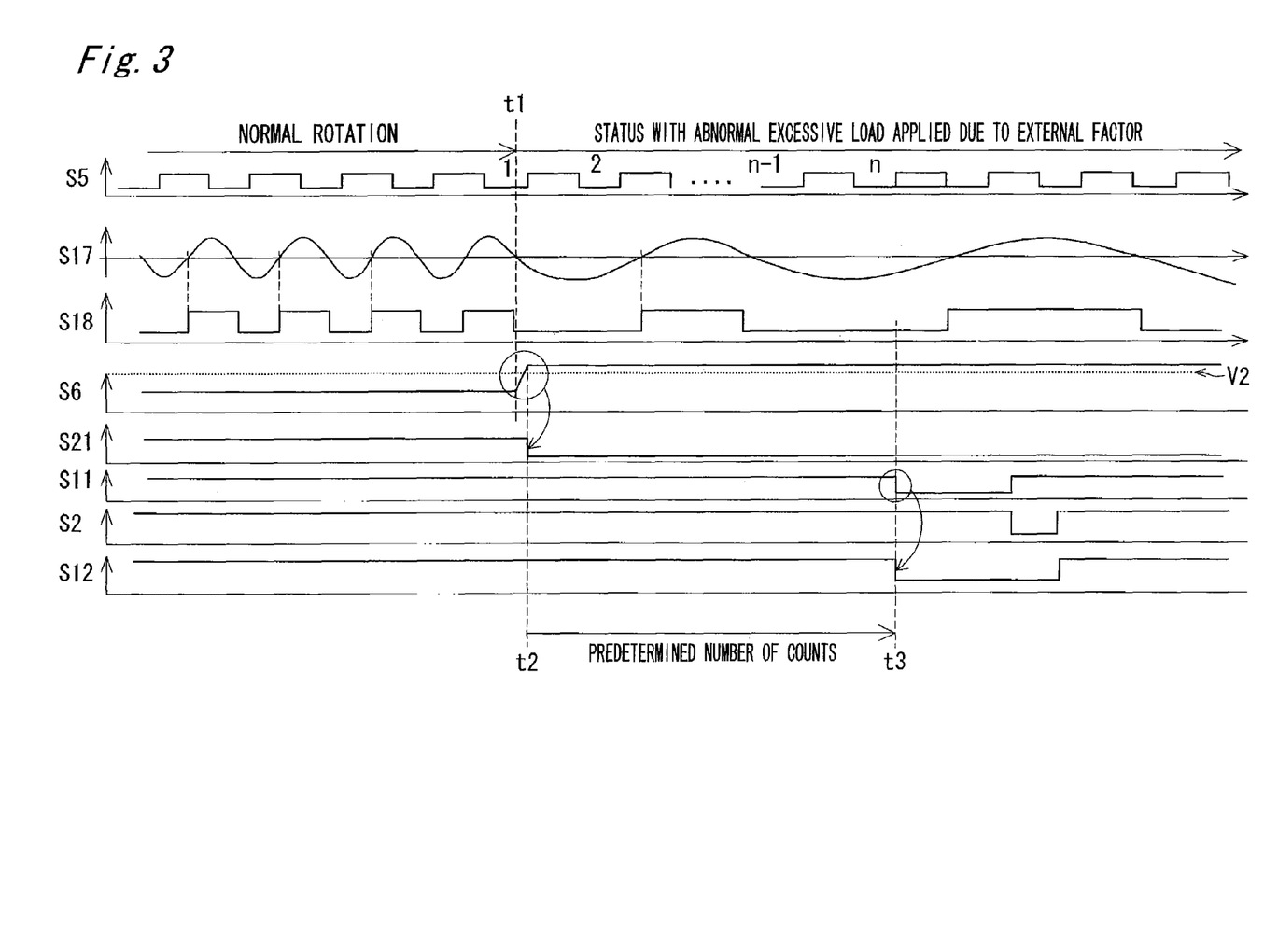
FIG. 3 is a diagram of output signal waveforms of sections in the motor driving apparatus according to embodiment 1.

FIG. 3 is a diagram showing changes of output signal waveforms of sections of the motor driving apparatus in the embodiment with protecting function working. The diagram shows the output signal S5 of the oscillation circuit 2, the position signal S17 of the motor 13, the output (position detection signal) S18 of the position detecting circuit 11, the output (speed control signal) S6 of the speed control circuit 1, the full torque detection level V2, the output S21 of the comparator 15, thes tart/stop signal S2, and the output signal S12 of the AND circuit 9.

During normal rotation, the speed control signal S6 is supplied depending on the target rotating speed. In the normal rotating state, the speed control signal S6 is equal to or lower than the full torque detection level V2, and the output S21 of the comparator 15 which compares the speed control signal S6 with the detection level V2 is at "H" level.

At time t1, when an abnormal excessive load by external factor is applied to the motor 13, the rotating speed of the motor 13 drops. As a result, the speed control signal S6 becomes an acceleration state, and reaches a level equal to or more than the full torque detection level V2, and at time t2, the output S21 of the comparator 15 is at "L" level.

When the output S21 of the comparator 15 is changed from "H" to "L", at this moment (t2), the counter 16 starts counting in synchronous with the clock S5 as the output of the oscillator 2. The counter 16 measures the continuing duration of the full torque status. The counter 16 counts a specified count number, and then counts up, so that the output S11 of the protection circuit 14 is changed from "H" to "L" (time t3). As the output of the protection circuit 14 is changed to "L", the signal S12 for cutting off the motor driving signal S16 is changed from "H" to "L", stopping the motor driving signal S16. Afterwards, the stop signal "L" is set in the start/stop signal S2, and thus the latch circuit 7 is reset, so that the signal S12 for cutting off the motor driving signal S16 is changed to "H".

However, since the stop signal "L" is set in the start/stop signal S2, the output S12 of the AND circuit 9 remains "L"

state, so that the cut-off state of the motor driving signal S16 is held. When the start signal "H" is entered in the start/stop signal, the output S12 of the AND circuit 9 is changed from "L" to "H", so that the cut-off state of the motor driving signal S16 is released.

Thus, in this embodiment, when the full torque status is detected to be continuous for a specified time, the protecting operation (cut-off of the motor driving signal S16) is started.

4. Driving Circuit

The details of the driving circuit 36 are described below.

<Configuration and Operation of Driving Circuit>

Figure 4:
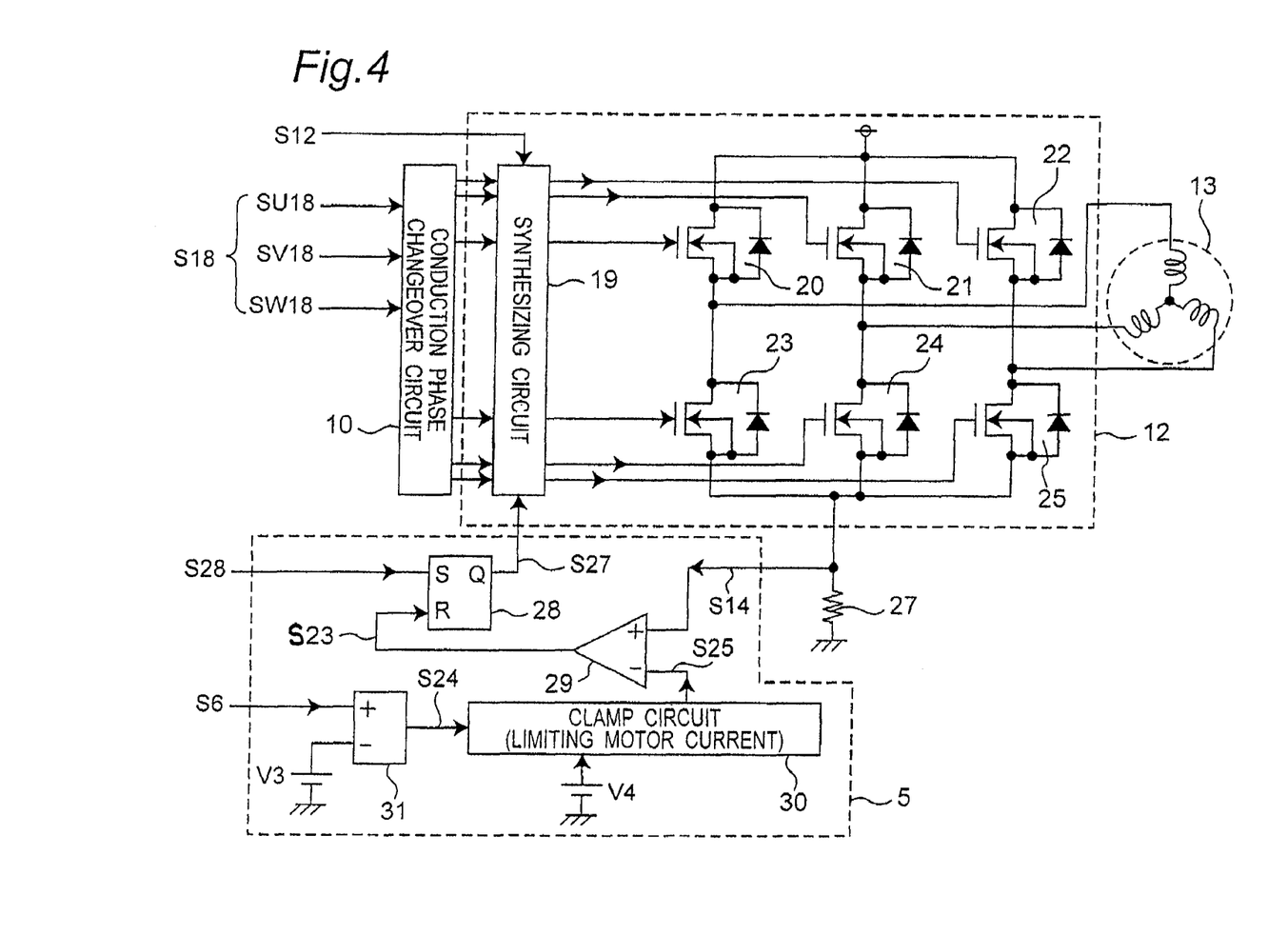
FIG. 4 is a diagram showing a detail configuration of a driving circuit in the motor driving apparatus.

FIG. 4 is a block diagram showing the detail of the driving circuit 36. In the diagram, the switching circuit 12 includes a synthesizing circuit 19, and switching elements 20, 21, 22, 23, 24, and 25. The PWM signal generating circuit 5 includes an amplifier 31, a clamp circuit 30, a comparator 29, and an RS flip-flop 28. The PWM signal generating circuit 5 generates a PWM signal with peak detection system. Accordingly, the motor current is detected by a current detecting resistance 27, and the detection result is fed into the PWM signal generating circuit 5.

The switching elements 20, 21, 22, 23, 24, and 25 are n type MOS (metal oxide semiconductor) transistors. Outputs SU 18, SV 18, and SW 18 of the position detecting circuit 11 are fed into the conduction phase changeover circuit 10. The conduction phase changeover circuit 10 outputs control signals for determining which one of switching elements 20, 21, 22, 23, 24, and 25 should be turned on or off, on the basis of the position signal of the motor 13. These control signals are fed into the synthesizing circuit 19.

The amplifier 31 receives the speed control signal S6, and amplifies the speed control signal S6 on the basis of a voltage V3 to generate and output a signal S24. The amplified signal S24 is fed into the clamp circuit 30 which clamps the upper limit with a voltage V4. The clamped output of amplifier 31 is fed into the comparator 29 as a signal S25.

The driving current of the motor 13 is converted into a voltage by the current detecting resistance 27, and is output as a current detecting voltage S14.

The comparator 29 compares the signal S25 with the current detecting voltage S14 and outputs "H" when the current detecting voltage S14 exceeds the voltage of the signal S25. The output S23 of the comparator 29 as "H" resets the RS flip-flop 28 so that its output S27 becomes "L".

On the other hand, the RS flip-flop 28 receives PWM reference pulses of a specific period as a signal S28. When the signal S28 becomes "H", the RS flip-flop 28 is set, and its output S27 is changed to "H".

By repetition of this operation of the RS flip-flop 28, PWM signal corresponding to the speed control signal S6 is output as the output S27. The signal S27 which is PWM signal is fed into the synthesizing circuit 19 and is synthesized with the output of the conduction phase changeover circuit 10. The conduction phase changeover circuit 10 determines the conduction phase, and outputs PWM controlled signals to switching elements 20, 21, 22, 23, 24, and 25, resulting in supply of the motor driving current.

<Output Signal Waveform>

Figure 5:
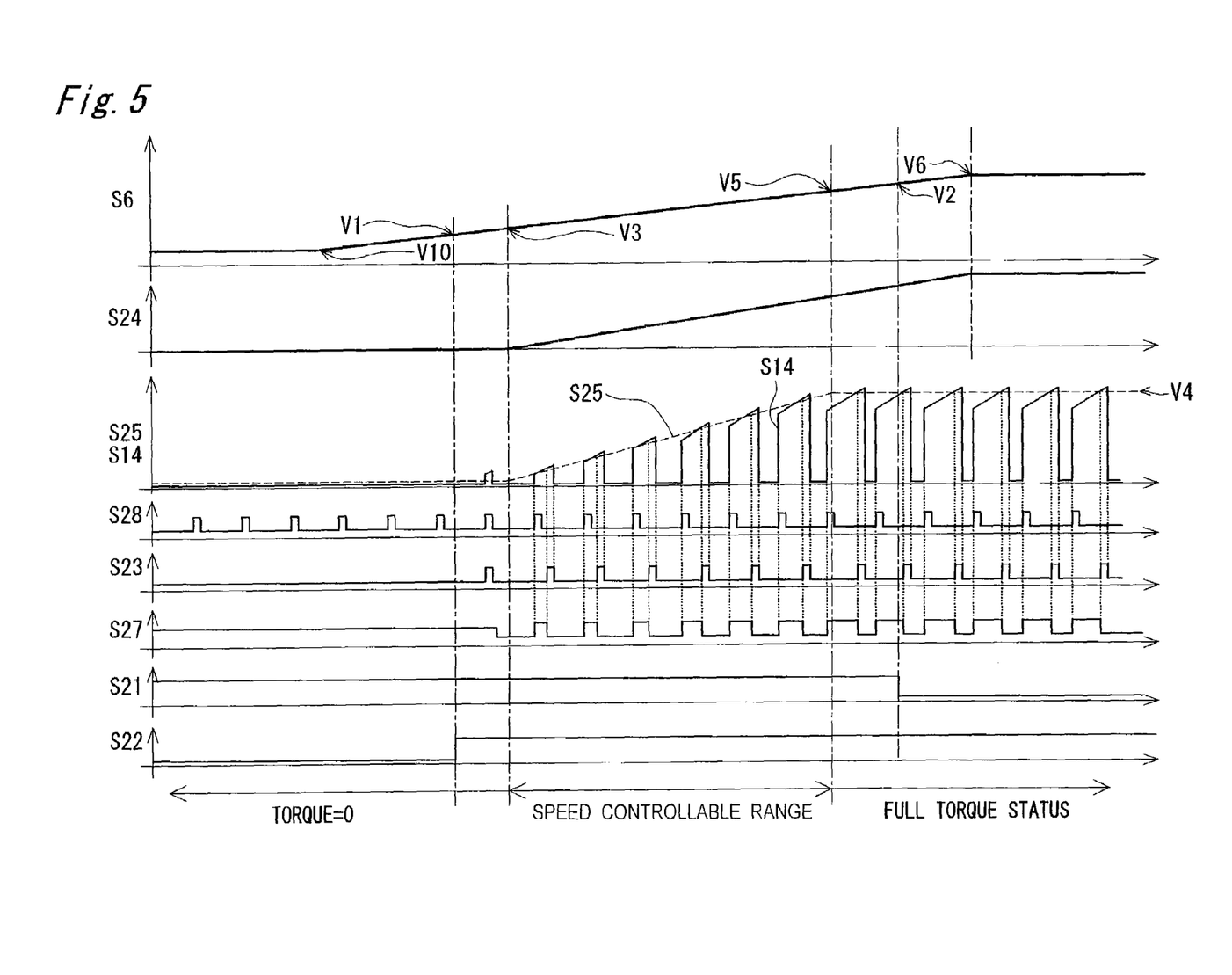
FIG. 5 is a diagram of output signal waveforms of sections in the motor driving apparatus according to embodiment 1.

FIG. 5 is a diagram showing time changes of output signals in the motor driving apparatus of the embodiment. The diagram shows the speed control signal S6, the output S24 of the amplifier 31, the signal S14 of the current detecting resistance 27, the output S25 of the clamp circuit 30, the PWM reference pulse S28, the output S23 of the comparator 29, the output signal S27 of the RS flip-flop, the output S21 of the comparator 15, and the output S22 of the deceleration command detecting circuit 4.

Voltage level of the speed control signal S6 varies with the rotating speed of the motor 13 determined by the target speed signal S3 and external load in a range to be controlled by the motor. The speed control signal S6 is amplified by the amplifier 31 on the basis of the reference voltage V3. The amplified signal is the signal S24. The signal S24 is fed into the clamp circuit 30, and its upper limited is clamped at the clamp voltage V4. The output of the clamp circuit 30 is the signal S25.

The speed controllable range covers from the reference voltage V3 of the amplifier 31 to the voltage V5 for clamping the signal S25, in the speed control signal S6.

In the speed controllable range, the motor driving current is converted into a voltage by the current detecting resistance 27 to obtain the signal S14. The comparator 29 compares the signal S14 with the output signal S25 of the clamp circuit 30. The output signal S27 is generated from the comparison result S23 and PWM reference pulse S28. On the basis of the output signal S27, the switching operation of each switching element of the switching circuit 12 is controlled. Consequently, the motor driving current is changed depending on the speed control signal S6.

On the other hand, out of the speed controllable range, that is, in the range of the signal S25 being clamped (the range in which the speed control signal S6 is the voltage V5 or more), the voltage of the signal S25 is kept at a constant value (V4), and hence the motor driving current is constant.

The full torque detection level (V2) is preferred to be equal to or more than the upper limit of the speed controllable range, that is, the voltage (V5) for clamping the output of the amplifier 31. Moreover, the full torque detection level (V2) is preferred to be less than the maximum value (V6) of the output of the speed control circuit 1.

The deceleration command detection level (V1) is preferred to be equal to or lower than the lower limit (V3) of the speed controllable range. The deceleration command detection level (V1) is also preferred to be higher than the minimum value (V10) of the output of the speed control circuit 1.

5. Summary

According to the motor driving apparatus of the embodiment, operation of the switching circuit is stopped when the full torque status (state of output of maximum torque command) is detected continuously for a specified time. That is, when the motor is overloaded and begins to decelerate, the protecting function can be put in operation before the motor is stopped completely. As a result, the protecting function can be executed promptly, and it is effective to prevent breakage of output transistors and stator windings due to excessive current flowing during time lag from stop of the motor by the overload until start of the protecting function as experienced in the prior art. Besides, the protecting function can be executed securely even if the motor is not stopped completely by a slightly abnormal overload applied to the motor.

Embodiment 2

Other example of the motor driving apparatus is shown. This embodiment is different from embodiment 1 in the configuration of a PWM signal generating circuit. Other configuration and operation are the same as in embodiment 1.

Figure 6:
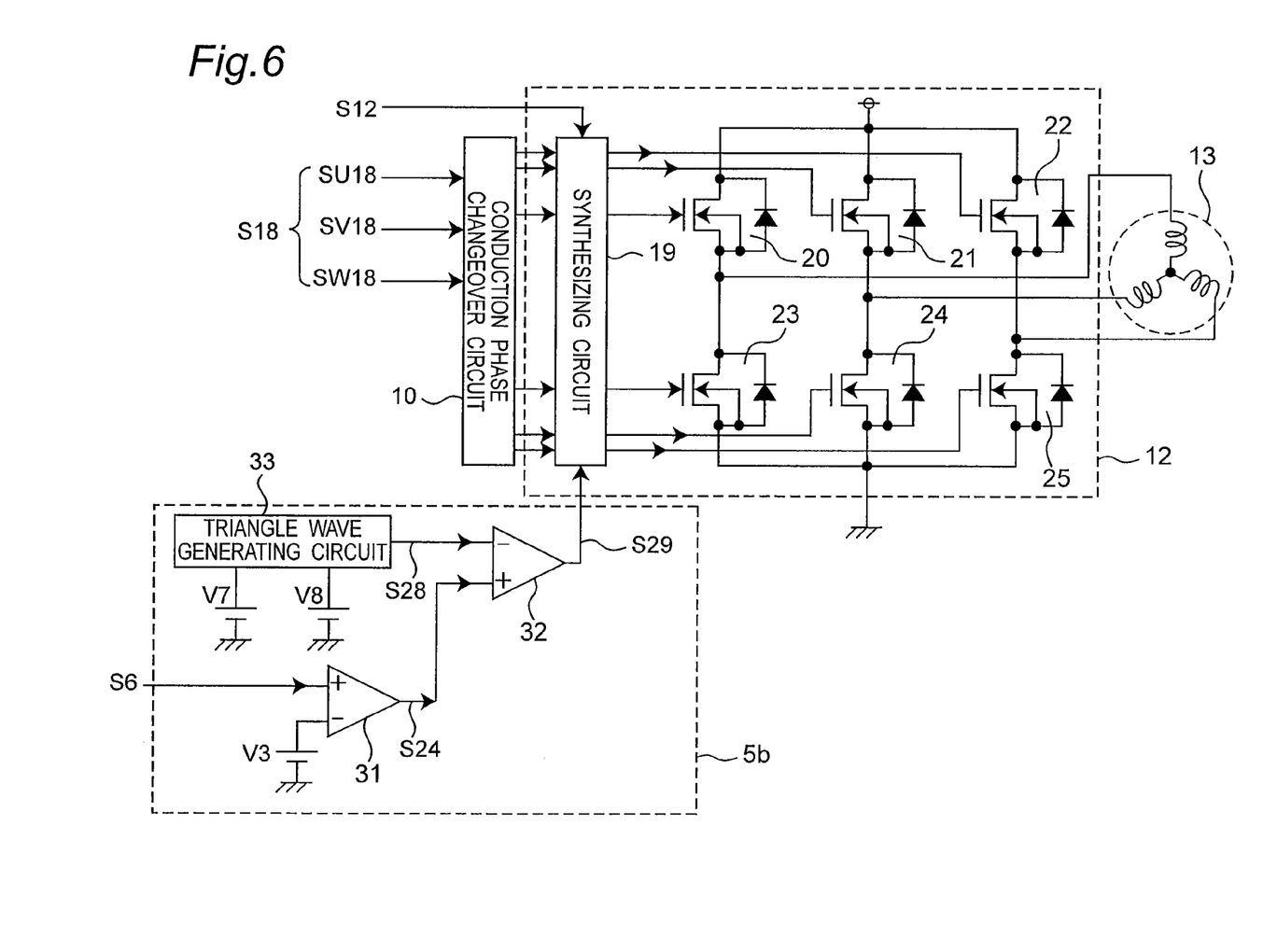
FIG. 6 is a diagram showing a detail configuration of a driving circuit (in particular, PWM signal generating circuit) according to embodiment 2 of the invention.

FIG. 6 shows a detail configuration of a PWM signal generating circuit in the motor driving apparatus of the present embodiment. The PWM signal generating circuit 5b in the embodiment includes an amplifier 31, a comparator 32, and a triangular wave oscillator 33.

The triangular wave oscillator 33 generates and outputs a triangular wave signal S28. The upper limit of the triangular wave signal S28 is determined by a voltage V7, and the lower limit is determined by a voltage V8.

The amplifier 31 compares the speed control signal S6 with the reference voltage V3 for providing the lower limit of the speed controllable range to output a comparison result S24. The comparator 32 compares the output signal S24 of the amplifier 31 with the triangular wave signal S28 to generate and output a PWM signal S29 depending on the speed control signal S6.

Figure 7:
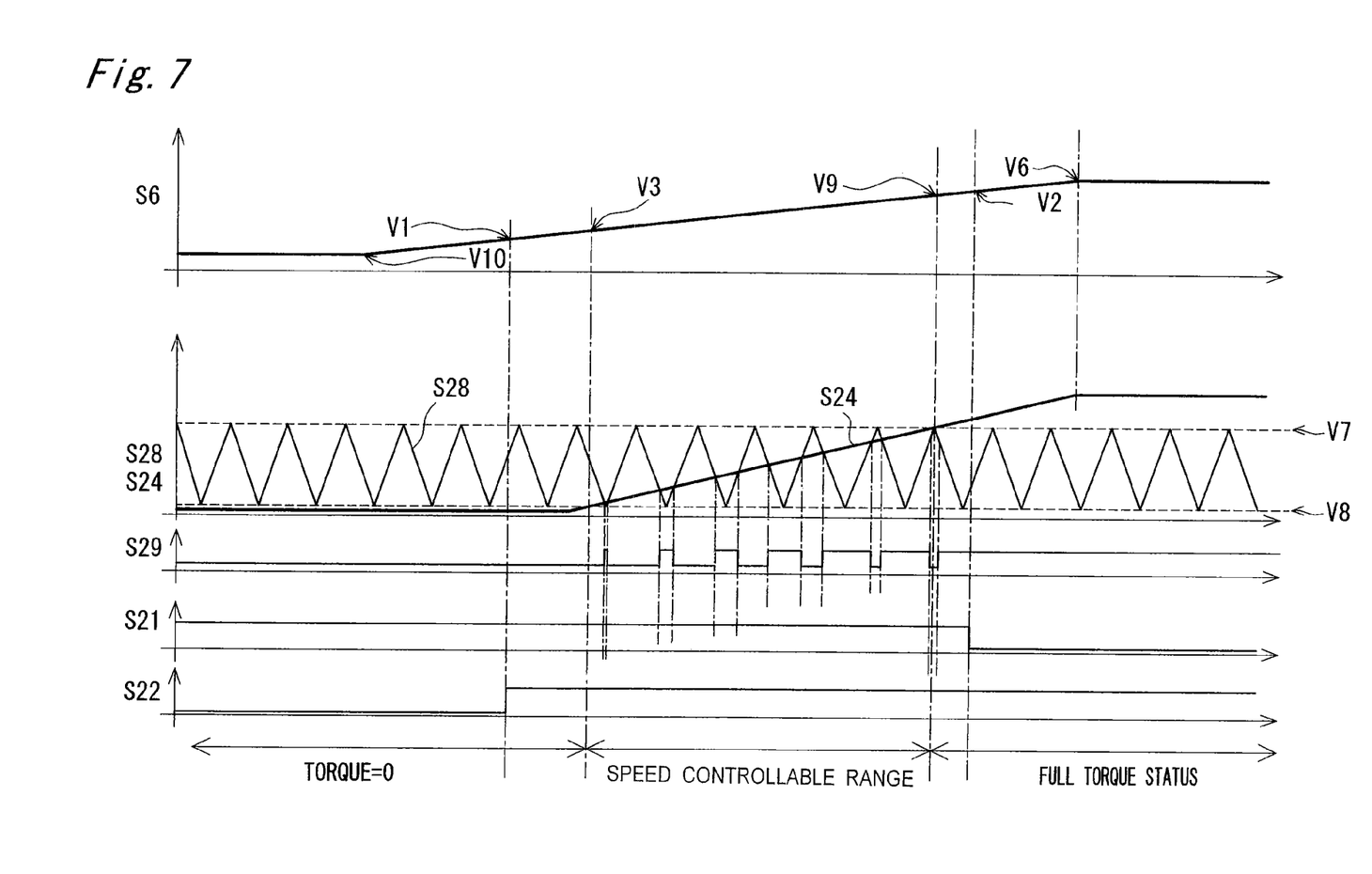
FIG. 7 is a diagram of output signal waveforms of sections in a motor driving apparatus according to embodiment 2.

FIG. 7 is a diagram showing temporal changes of output signals in the motor driving apparatus of the embodiment. The diagram shows the speed control signal S6, the output S24 of the amplifier 31, the output S28 of the triangular wave oscillator 33, the output S29 of the comparator 32, the output S21 of the comparator 15, and the output S22 of the deceleration command detecting circuit 4.

Voltage level of the speed control signal S6 varies with the rotating speed of the motor 13 determined by the target speed signal S3 and with external load in a range to be controlled by the motor. The speed control signal S6 is amplified by the amplifier 31 on the basis of the reference voltage V3. This amplified signal is signal S24.

The speed controllable range is, with respect to the amplified signal S24, from the point at which the amplified signal S24 reaches the lower limit voltage V8, to the point at which the amplified signal S24 reaches the upper limit voltage V7. With respect to the speed control signal S6, the speed controllable range covers from the voltage at which the speed control signal S6 reaches the reference voltage V3 of the amplifier 31, to the voltage (V9) at which the signal S24 reaches or exceeds the maximum voltage V7 of the triangular wave (that is, the voltage at which PWM signal S29 reaches the maximum duty).

Hence, the full torque detection level (V2) is preferred to be equal to or more than the upper limit (V9) of the speed controllable range. Moreover, the full torque detection level (V2) is preferred to be less than the maximum value (V6) of the output of the speed control circuit 1.

The deceleration command detection level (V1) is preferred to be equal to or lower than the lower limit (V3) of the speed controllable range in which the signal S24 reaches the voltage V8, and higher than the minimum value (V10) of the output of the speed control circuit 1.

In this embodiment, same as in embodiment 1, the full torque status is detected by the full torque detecting circuit 6, and operation of the switching circuit 12 is stopped when the full torque status is detected continuously for a specified time. As a result, the protecting function can be executed before the motor is stopped completely. It is hence effective to prevent breakage of output transistors and stator windings due to excessive current flowing during time lag from stop of the motor by overload until start of the protecting function as experienced in the prior art. Besides, the protecting function can be executed securely even if the motor is not stopped completely with a slightly abnormal overload applied to the motor.

In the foregoing embodiments, the motor driving apparatus can be realized in a semiconductor integrated circuit. At this time, it may be realized by one chip, or functions may be dispersed in a plurality of chips.

INDUSTRIAL APPLICABILITY

The invention can be applied to a motor driving apparatus, and particularly is useful in a motor driving apparatus using an application having a possibility of receiving abnormal excessive load by certain external factors.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2005-332601, filed on Nov. 17, 2005, which is expressly incorporated herein by reference in its entirety.

What is claimed is:

1. A motor driving apparatus comprising:
    a speed control circuit for outputting a speed control signal on the basis of a target speed command and rotating speed information of a motor;
    a PWM signal generating circuit for generating and outputting a PWM signal on the basis of the speed control signal;
    a switching circuit for feeding power to motor windings on the basis of the PWM signal; and
    a protection circuit including a full torque detecting circuit for detecting a full torque status in which the speed control signal is a signal for instructing maximum torque, the protection circuit outputting a signal for stopping the switching circuit when the full torque detecting circuit detects the full torque status continuously for a specified time,
    wherein the protection circuit further has a latch circuit for holding the signal for stopping the switching circuit, and a holding state of the latch circuit is released by a signal for instructing stop of the motor operation.

2. The motor driving apparatus of claim 1, wherein the protection circuit further has a deceleration command detecting circuit for outputting a deceleration command detection signal when detecting that the speed control signal becomes lower than a speed controllable range, and the holding state of the latch circuit is released by the deceleration command detection signal.

3. The motor driving apparatus of claim 1, further comprising a supply voltage reset circuit for outputting a reset signal when detecting that a supply voltage is equal to or lower than a specified value,
    wherein the holding state of the latch circuit is released by the reset signal.

4. The motor driving apparatus of claim 1, wherein the PWM signal generating circuit includes
    a current detecting resistance for detecting a motor driving current,
    an amplifier for amplifying the speed control signal,
    a clamp circuit for receiving an output of the amplifier, and clamping the output to a clamp voltage when the output of the amplifier exceeds the specified clamp voltage,
    a comparator for comparing the voltage generated on the current detecting resistance with the output voltage of the clamp circuit, and
    a circuit for generating the PWM signal on the basis of the output signal of the comparator.

5. The motor driving apparatus of claim 4, wherein the detection level of the full torque detecting circuit is set at a value equal to or more than the value of the speed control signal provided when the output of the amplifier reaches the clamp voltage.

6. The motor driving apparatus of claim 1, wherein the PWM signal generating circuit includes
a triangular wave oscillator for generating a triangular wave,
an amplifier for amplifying the speed control signal on the basis of a specified voltage, and
a comparator for comparing the output signal of the amplifier and the output signal of the triangular wave oscillator to output the PWM signal.

7. The motor driving apparatus of claim 6, wherein the detection level of the full torque detecting circuit is set at a value equal to or more than the voltage of the speed control signal provided when the duty of the PWM control signal becomes maximum.

8. The motor driving apparatus of claim 1, wherein the specified time is set at one second or more.

9. A semiconductor integrated circuit comprising:
a speed control circuit for outputting a speed control signal on the basis of a target speed command and rotating speed information of a motor;
a PWM signal generating circuit for generating and outputting a PWM signal on the basis of the speed control signal;
a switching circuit for feeding power to motor windings on the basis of the PWM signal; and
a protection circuit including a full torque detecting circuit for detecting a full torque status in which the speed control signal is a signal for instructing maximum torque and for outputting a signal for stopping the switching circuit when the full torque detecting circuit detects the full torque status continuously for a specified time, the protection circuit further including a latch circuit for holding the signal for stopping the switching circuit,
wherein the holding state of the latch circuit is released by a signal for instructing stop of the motor operation.

10. A control method of a motor driving apparatus including a speed control circuit for outputting a speed control signal on the basis of a target speed command and rotating speed information of a motor, a PWM signal generating circuit for generating and outputting a PWM signal on the basis of the speed control signal, a switching circuit for feeding power to motor windings on the basis of the PWM signal,
the control method comprising:
detecting a full torque status in which the speed control signal is a signal for instructing maximum torque;
outputting a signal for stopping the switching circuit when the full torque status is detected continuously for a specified time;
holding the signal for stopping the switching circuit; and
releasing the holding state by a signal for instructing stop of the motor operation.

* * * * *